(12) United States Patent
Marioni

(10) Patent No.: US 12,261,487 B2
(45) Date of Patent: Mar. 25, 2025

(54) PERMANENT MAGNET EXTERNAL ROTOR FOR ELECTRIC MOTOR, ELECTRIC MOTOR COMPRISING SAID ROTOR AND METHOD FOR MANUFACTURING SAID EXTERNAL ROTOR

(71) Applicant: ASKOLL HOLDING S.r.l. a socio unico, Povolaro di Dueville (IT)

(72) Inventor: Elio Marioni, Dueville (IT)

(73) Assignee: ASKOLL HOLDING S.r.l. a socio unico, Povolaro di Dueville (IT)

( * ) Notice: Subject to any disclaimer, the term of this patent is extended or adjusted under 35 U.S.C. 154(b) by 1 day.

(21) Appl. No.: 17/881,049

(22) Filed: Aug. 4, 2022

(65) Prior Publication Data
US 2023/0045169 A1 Feb. 9, 2023

(30) Foreign Application Priority Data

Aug. 6, 2021 (EP) ..................... 21425039

(51) Int. Cl.
*H02K 1/2786* (2022.01)
*H02K 15/03* (2006.01)
*H02K 15/10* (2006.01)

(52) U.S. Cl.
CPC ........... *H02K 1/2786* (2013.01); *H02K 15/03* (2013.01); *H02K 15/10* (2013.01)

(58) Field of Classification Search
CPC .... H02K 1/187; H02K 1/2726; H02K 1/2733; H02K 1/2786; H02K 1/15; H02K 1/2788; H02K 15/028; H02K 15/03; H02K 15/12; H02K 15/125; H02K 15/01; H02K 37/06; H02K 33/02
See application file for complete search history.

(56) References Cited

U.S. PATENT DOCUMENTS

| | | | |
|---|---|---|---|
| 3,581,394 A | 6/1971 | Phelon | |
| 4,201,281 A * | 5/1980 | Fraser | F16D 27/105 192/35 |
| 9,806,581 B2 * | 10/2017 | Hill | H02K 1/2791 310/43 |
| 2010/0156231 A1* | 6/2010 | Lee | H02K 1/148 310/179 |
| 2015/0352883 A1* | 12/2015 | Schmid | B05D 3/207 |
| 2018/0026489 A1 | 1/2018 | Hill et al. | |

FOREIGN PATENT DOCUMENTS

| | | | |
|---|---|---|---|
| CN | 207968103 U | * 10/2018 | ............... H02K 1/22 |
| DE | 10 2010 051264 A1 | 5/2012 | |
| WO | 2004/040737 A1 | 5/2004 | |

OTHER PUBLICATIONS

17881049_Dec. 18, 2024_CN_207968103_U_H.pdf (Year: 2024).*
European Search Report issued Jan. 12, 2022 in connection with corresponding European Patent Application No. 21 42 5039.

* cited by examiner

*Primary Examiner* — Christopher M Koehler
*Assistant Examiner* — Ahmed F Seck
(74) *Attorney, Agent, or Firm* — Akerman LLP

(57) ABSTRACT

Permanent magnet external rotor (1) for an electric motor, comprising a cup-shaped body (2) provided with a bottom (20) and a side wall (21); at least one magnet (3), defining a plurality of poles and fixed inside said cup-shaped body (2); and a metal insert (4), defined by a helical spring fitted around the at least one magnet (3) which forms the closure of a magnetic circuit of the electric motor.

15 Claims, 7 Drawing Sheets

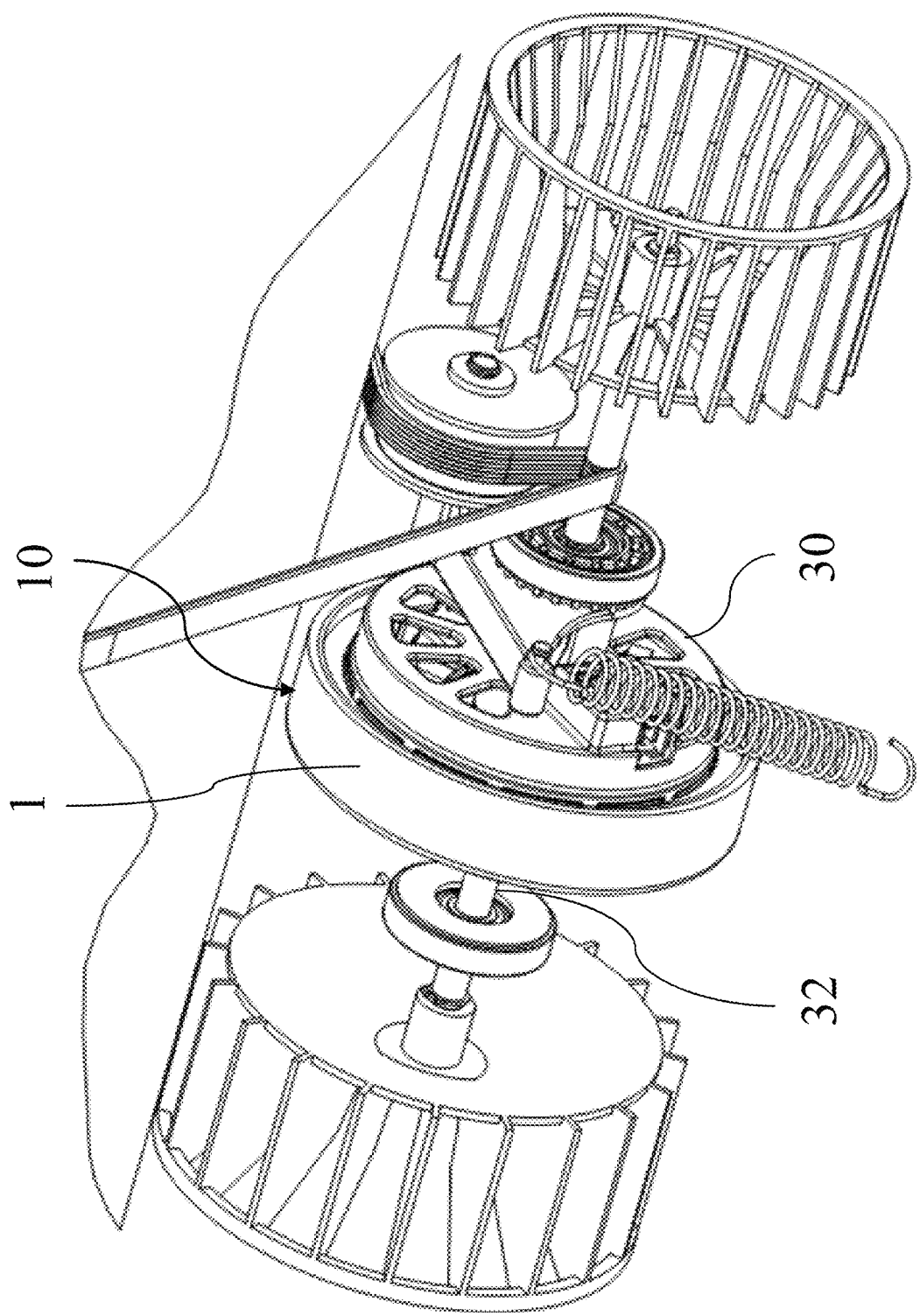

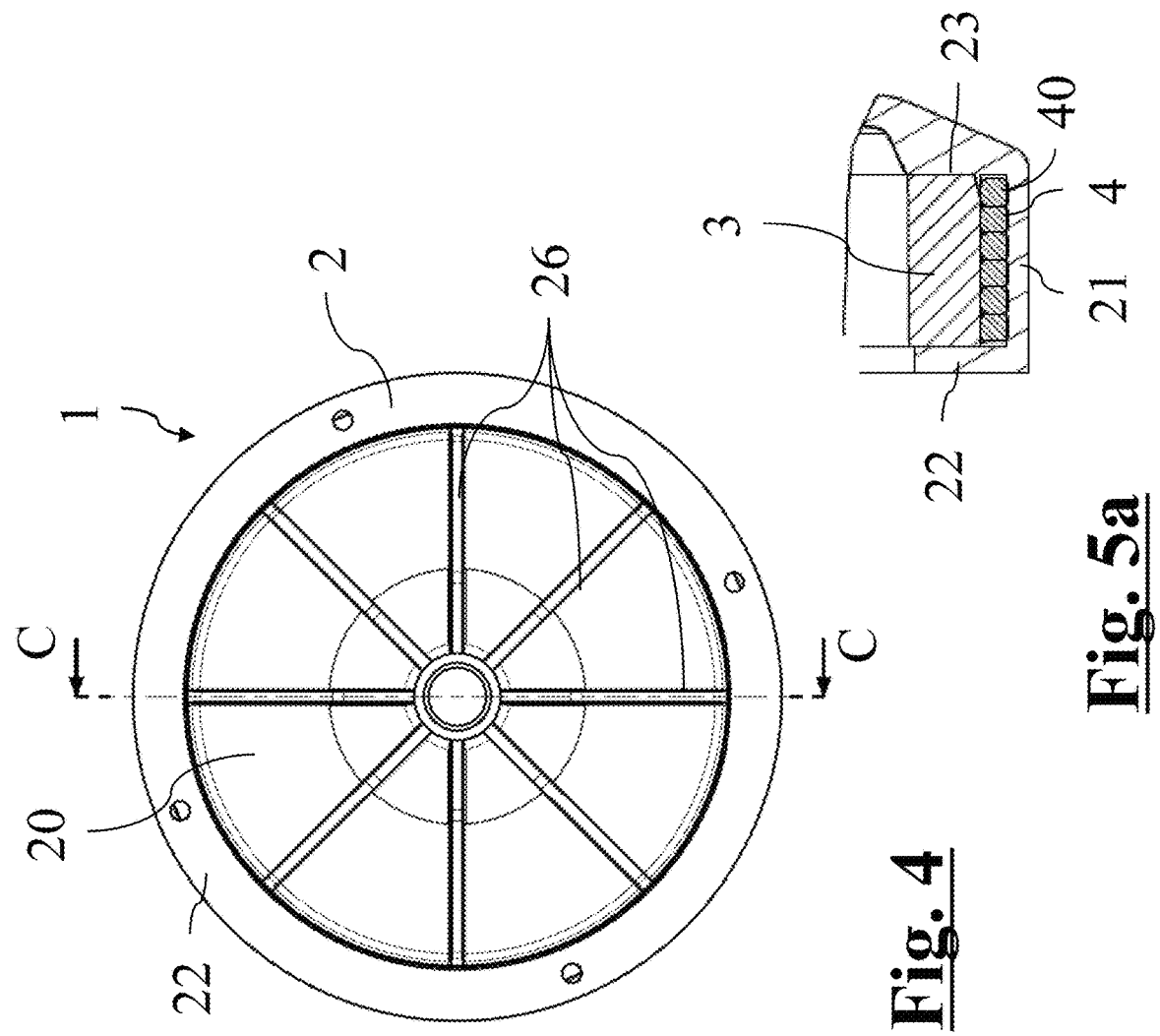
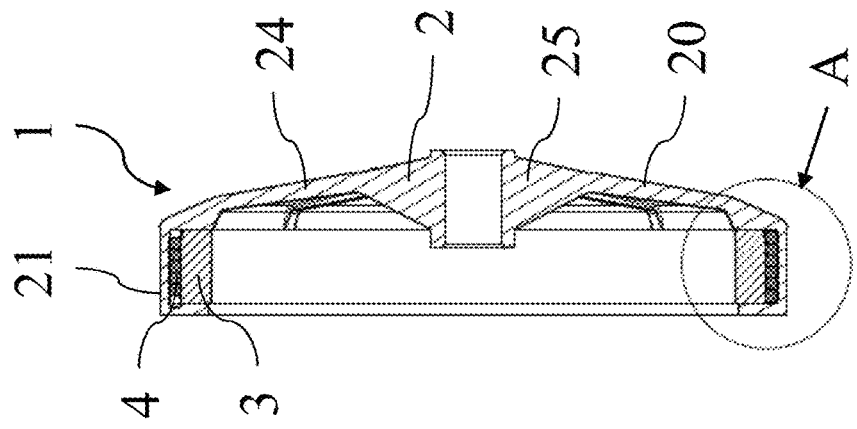
Fig. 4
Fig. 5a
Fig. 5

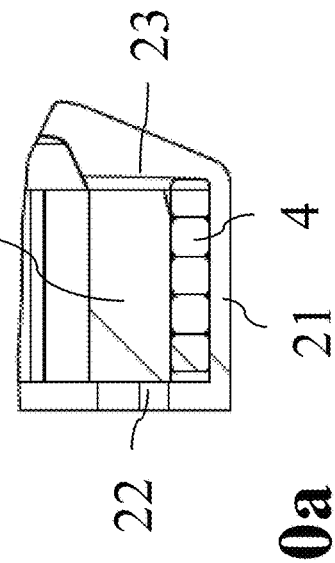
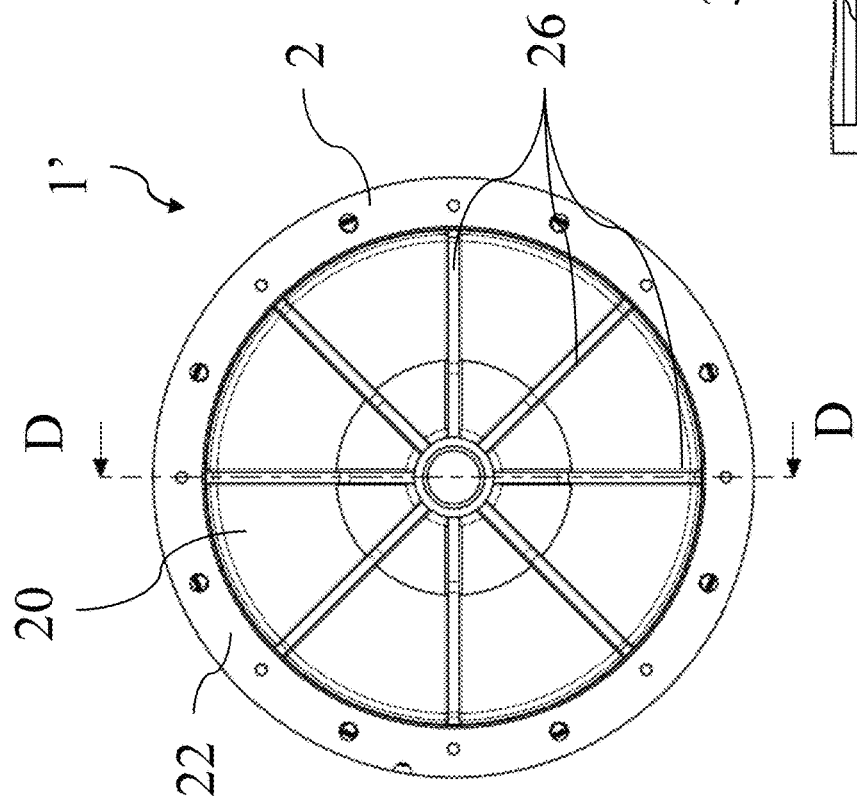
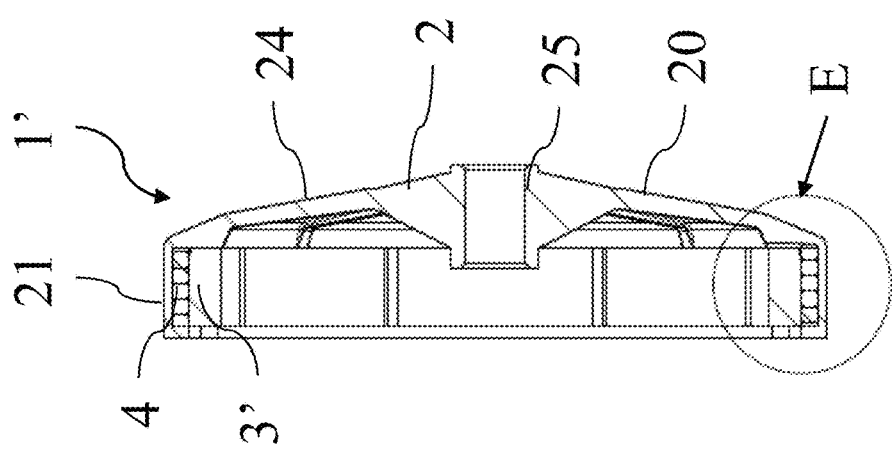
Fig. 9
Fig. 10a
Fig. 10

PERMANENT MAGNET EXTERNAL ROTOR FOR ELECTRIC MOTOR, ELECTRIC MOTOR COMPRISING SAID ROTOR AND METHOD FOR MANUFACTURING SAID EXTERNAL ROTOR

CROSS-REFERENCE TO RELATED APPLICATIONS

The present application claims priority to European Patent Application No. 21425039.1, filed on Aug. 6, 2021, the entirety of which is incorporated herein by reference.

FIELD OF APPLICATION

The present invention relates, according to its more general aspect, to a permanent magnet external rotor, in particular for a synchronous electric motor, and to an electric motor comprising such a component.

The invention also relates to a method for manufacturing said external rotor.

The technical field of the invention therefore concerns electric machines. Electric motors with permanent magnet external rotors may find a useful application in various industrial sectors; more specifically, the present invention has a preferred application in the industrial sector of large-size electric household appliances, for example in the motors for operating the drum and/or the fans in washing machines or in laundry drying machines.

PRIOR ART

Electric motors with a permanent magnet rotor are known in the art and at present are used in a plurality of applications, including the operation of components and pumps in electric household appliances.

The conventional configuration of these like other motors comprises an internal rotor rotating inside a fixed stator; in some cases, however, it is preferred to use an external, cup-shaped, rotor which surrounds a central stator. This solution has proved for example to be particularly advantageous, allowing a substantial reduction in the dimensions, during the manufacture of a motor unit which operates fan and drum of laundry drying machines.

The external rotor of these electric motors, in particular in the sectors such as that of electric household appliances in which the small dimensions and production costs of the components are critical, may be advantageously made from a plasto-ferrite toroidal magnet which defines a plurality of magnetic poles; alternatively, it is possible to use a plurality of ferrite magnetic wedges arranged next to each other so as to define a ring. The ring is inserted inside the aforementioned cup-shaped structure, which may be formed as a cap made of plastic material. It is obviously indispensable to insert a metal ring on the outside of the magnets, in order to close the magnetic circuit and allow operation of the electric machine.

The operation of joining together the metal ring and magnets is a critical step in the production process since it is required to ensure close contact between the two elements in order to guarantee correct operation of the motor. It is therefore necessary to design extremely precisely the dimensions of the metal ring which must be able to fit perfectly on top of the toroidal magnet or the plurality of magnets arranged next to each other. This constraint on the tolerances is particularly onerous, also in view of the ratio between the diameter and axial length of the two elements to be joined together. Moreover, the joining step itself is also costly in technological and time-related terms.

It is pointed out that the metal ring considered in the prior art is structurally rigid owing to its closed-sleeve configuration; on the other hand, it is not possible to make the part more elastic by designing it as an open metal band since there is the risk of the magnetic circuit being interrupted in the region of the opening if the gap is too big.

A further difficulty arises more specifically with regard to the manufacture of the external rotor using a plurality of magnetic wedges. In fact, during moulding the injected liquid risks displacing the individual wedges, resulting in an irregular form in the region of the air gap, this being unacceptable for correct operation of the electric machine. For this reason, nowadays the more costly variant with a continuous ring made of plasto-ferrite is preferred, this requiring precise and costly machine-grinding of the cylindrical inner surface.

The technical problem underlying the present invention is therefore that of devising an alternative embodiment of the external rotor which allows simplification of the production process and reduction of the manufacturing costs, in particular avoiding the need to provide a metal component with very precise dimensional tolerances.

SUMMARY OF THE INVENTION

The technical problem described above is solved by a permanent magnet external rotor for an electric motor, comprising a cup-shaped body provided with a bottom and a side wall; at least one magnet, defining an annular configuration and fixed inside said cup-shaped body; and a metal insert—which is preferably ferromagnetic—arranged between said side wall and said at least one magnet so as to define the closure of a magnetic circuit of the electric motor; wherein said metal insert is formed by a helical spring fitted around the annular configuration defined by the at least one magnet.

It is pointed out that the annular configuration may be defined by a single toroidal magnet, for example a plasto-ferrite ring defining a plurality of poles or, alternatively, by a plurality of magnetic wedges arranged next to each other.

The solution to the technical aforementioned technical problem consists in the original use of a helical spring, namely a spirally wound metal body which adapts elastically to the annular configuration of the at least one magnet onto which it is fitted, but which on the other hand ensures the continuity of material along the entire circumference and the consequent closure of the magnetic circuit.

The helical spring ensures perfect joining together of the magnet and ferromagnetic insert, while minimizing the difficulties associated with manufacture of the assembly.

The use of a helical spring is furthermore advantageous when a plurality of magnetic wedges rather than a single toroidal magnet is used. In this case, in fact, the spring grips the annular structure defined by the adjacent magnets and helps keep the said magnets in position during the operations for overmoulding the outer cap. The alignment of the intrados surfaces of the successive wedges is thus ensured, making the constructional step easier and more efficient.

Preferably, at least the side wall of said cup-shaped body is made of a plastic material overmoulded onto the at least one magnet and onto the metal insert. It is obviously preferable, for reasons of manufacturing economy, to make the entire cup-shaped body as a single overmoulded component; alternatively, it is possible to consider making only the side wall of plastic and then joining it together with other components of the cup-shaped body which are made separately.

Preferably, said cup-shaped body comprises a flange and an internal shoulder which axially confine said metal insert at the opposite ends, exerting a retaining action on the spring.

Preferably, the flange and the internal shoulder also cover, wholly or partly, the opposite axial ends of the annular configuration defined by the magnet, such that the magnetic element is seated surrounded on at least three sides by the plastic overmoulding.

Again preferably, the at least one magnet is left free of the overmoulded plastic along its inner surface, arranged to face the air gap in the completed electric motor.

The helical spring which defines the metal insert has preferably, in the rest configuration, an internal diameter smaller than the external diameter of the annular configuration defined by the at least one magnet, such that said helical spring is elastically deformed when fitted onto the at least one magnet.

It is also pointed out that the helical spring has, in the rest configuration, windings packed together and a length substantially equal to the axial length of the toroidal magnet. An armature which surrounds substantially completely the underlying permanent magnet is thus obtained.

The windings of the helical spring preferably have a square or rectangular cross-section so as to ensure as far as possible a uniform thickness of the magnetic circuit which encloses the rotor poles.

It is pointed out that the side wall of the cup-shaped body is preferably cylindrical.

The bottom, on the other hand, may comprise a central hub connected, by means of a continuous cap or a plurality of radial arms, to the side wall. The continuous cap, where present, may have its concavity which is directed towards the side wall and on which projecting radial ribs may be provided.

The aforementioned technical problem is also solved by an electric motor comprising an internal stator provided with a plurality of poles and an external rotor of the type defined above, mounted rotatably on top of said internal stator, wherein the annular configuration of said at least one magnet surrounds the poles with the arrangement of an air gap in between.

The aforementioned technical problem is also solved by a method for manufacturing a permanent magnet external rotor for an electric motor, comprising the steps of:

providing one or more magnets so as to define an annular configuration;

fitting a helical spring made of metallic—preferably ferromagnetic—material around an outer cylindrical wall of the annular configuration of said at least one magnet;

overmoulding, on top of the annular configuration of the at least one magnet and the helical spring fitted thereon, a cup-shaped containing body at least partially made of plastic material, wherein said cup-shaped body comprises a bottom and a side wall which surrounds externally the helical spring fitted onto the at least one magnet.

As indicated above, the at least one magnet may consist of a single toroidal magnet or a plurality of magnetic wedges arranged next to each other.

As mentioned above with reference to the device, in the case where there is a plurality of magnetic wedges, the helical spring, during the course of overmoulding, grips and keeps in the annular configuration the said wedges, acting against the thrusting forces of the injected material which could otherwise displace the elements.

Preferably, the overmoulding mould is designed to keep in position the two axial ends of the helical spring which otherwise could be deformed by the flow of the injected material during the injection moulding operations.

Further characteristic features and advantages of the present invention will emerge from the description, provided hereinbelow, of two preferred examples of embodiment provided by way of a non-limiting example with reference to the accompanying drawings.

BRIEF DESCRIPTION OF THE DRAWINGS

FIG. 1 shows a side view of a motor unit for a laundry drier, comprising an electric motor according to the present invention;

FIG. 4 shows a front view of the external rotor according to FIG. 2;

FIG. 5 shows a side view of the external rotor in accordance with the first variant of the present invention, cross-sectioned along the plane C-C indicated in FIG. 4;

FIG. 5a shows a detail identified by A in FIG. 5, suitably enlarged so as to allow the constructional details to be seen more clearly;

FIG. 9 shows a front view of the external rotor according to FIG. 7;

FIG. 10 shows a side view of the external rotor in accordance with the second variant of the present invention, cross-sectioned along the plane D-D indicated in FIG. 9;

FIG. 10a shows a detail identified by D in FIG. 10, suitably enlarged so as to allow the constructional details to be seen more clearly;

DETAILED DESCRIPTION

Figure 3:
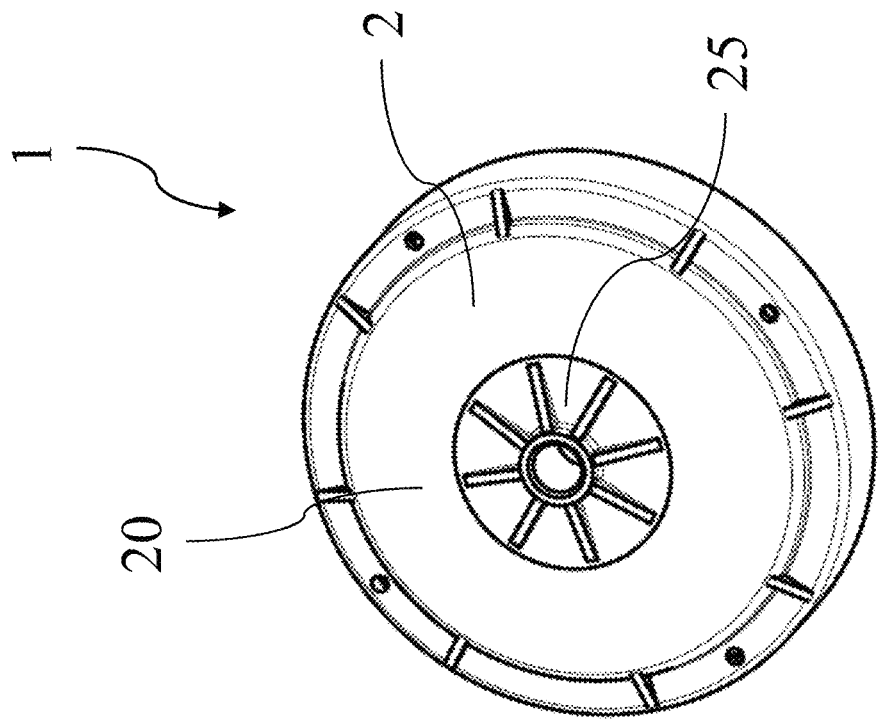
FIG. 3 shows a perspective view of the external rotor of FIG. 2 from a different angle.
Figure 2:
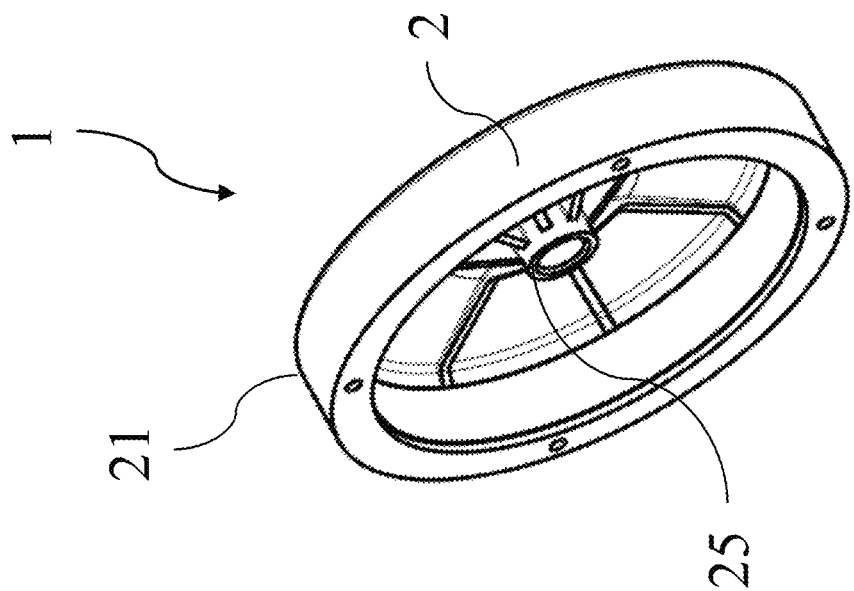
FIG. 2 shows a perspective view of an external rotor in accordance with a first variant of the present invention.
Figure 6:
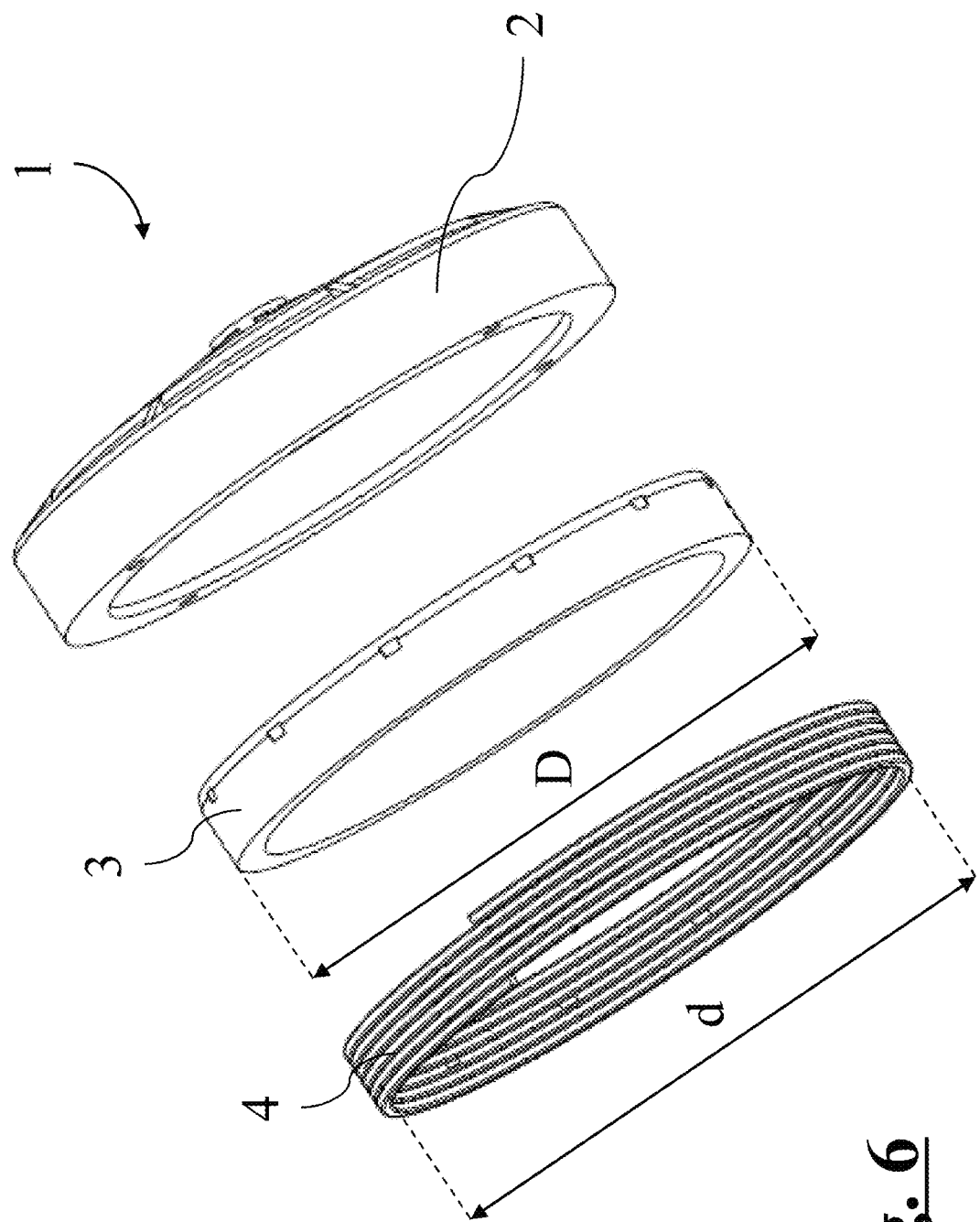
FIG. 6 shows an exploded perspective view of the external rotor in accordance with the first variant of the present invention.

With reference to the attached FIGS. 1-6, 1 denotes in general a first embodiment of a permanent magnet external rotor for an electric motor, in particular for a synchronous electric motor.

The electric motor according to the present invention is identified by 10 and shown, in the attached FIG. 1, in the preferred context of an application involving driving of the drum and fans in a laundry drying machine.

In a manner known per se, the electric motor 10 is a synchronous electric motor designed to rotationally drive a drive shaft 32 on which, in the example of embodiment shown here, fans and a pulley for operating the drum of the laundry drying machine are keyed. The electric motor has an internal stator 30, comprising a plurality of poles—not shown in the figures—on which the external rotor 1, integral with the drive shaft 32, is rotatably mounted. The external rotor 1 surrounds, with an air gap situated in between, the poles of the internal stator 30.

The external rotor 1 according to the first variant uses a toroidal magnet 3, which is formed in particular as a plasto-ferrite ring and onto which a metal insert 4 consisting of a helical spring made of ferromagnetic material is fitted. A plastic cap which defines a cup-shaped body 2 of the rotor is overmoulded on top of the assembly formed by the toroidal magnet 3 and the helical spring.

The helical spring has windings 40 with a square cross-section which are packed together in the rest configuration such that it is arranged on top of the toroidal magnet 3 in the manner of a ferromagnetic covering with a substantially uniform thickness, thus suitably closing the magnetic circuit on the rotor. The windings 40, which in the preferred embodiment shown here are five in number, cover an axial length substantially equal to the axial thickness of the toroidal magnet 3. It is also pointed out that the internal diameter d in the rest condition of the helical spring has a value slightly smaller than the external diameter D of the toroidal magnet 3; in this way the helical spring is deformed elastically in the radial direction when it is fitted on top of the magnet.

The cup-shaped body 2 which is overmoulded using plastic material has a bottom 20, which is designed to cover laterally the electric motor 10 and which is connected to a substantially cylindrical side wall 21, projecting in the direction of the opening of the cup-shaped body 2.

The bottom 20 comprises a hub 25, which in the embodiment shown has a through-hole for keying onto the drive shaft 32, and a continuous cap 24, which is preferably concave towards the inside of the cup-shaped body 2 and which is connected to the side wall 21.

The continuous cap 24 has on its concave inner surface a plurality of radial ribs 26 extending towards the peripheral edge; similar ribs are also present on the outer surface of the bottom 20 but only involve the hub portion 25.

The continuous cap 24 defines a shoulder 23 opposite which a front flange 22 of the side wall 21 is situated. The flange 22 and shoulder 23 axially enclose the assembly formed by the toroidal magnet 3 and the helical spring fitted on top of it. The helical spring is moreover radially confined by the side wall 21 and is therefore completely embedded inside the plastic overmoulding. On the other hand, the toroidal magnet 3 has a free inner side designed to the face the air gap of the electric motor 10.

The external rotor 1 described above is made by means of overmoulding of the cup-shaped body 2 on top of the assembly formed by the toroidal magnet 3 and by the ferromagnetic helical spring fitted on top of it.

It is pointed out that the overmoulding mould used in the production is designed to keep in position the two axial ends of the helical spring which otherwise could be deformed by the flow of the injected material during the injection moulding operations.

Figure 8:
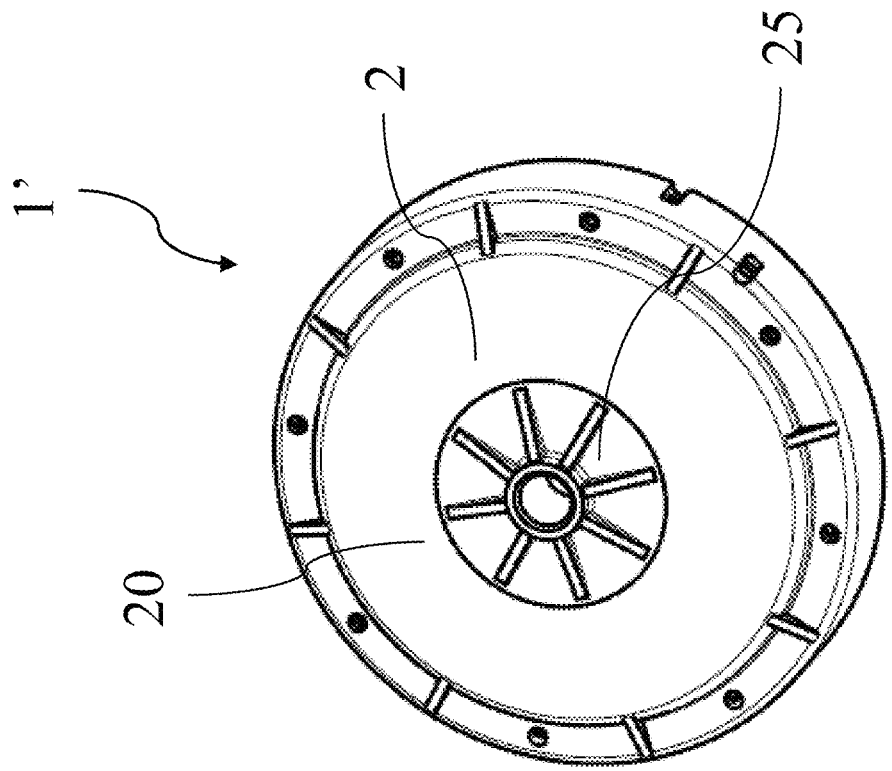
FIG. 8 shows a perspective view of the external rotor of FIG. 7 from a different angle.
Figure 7:
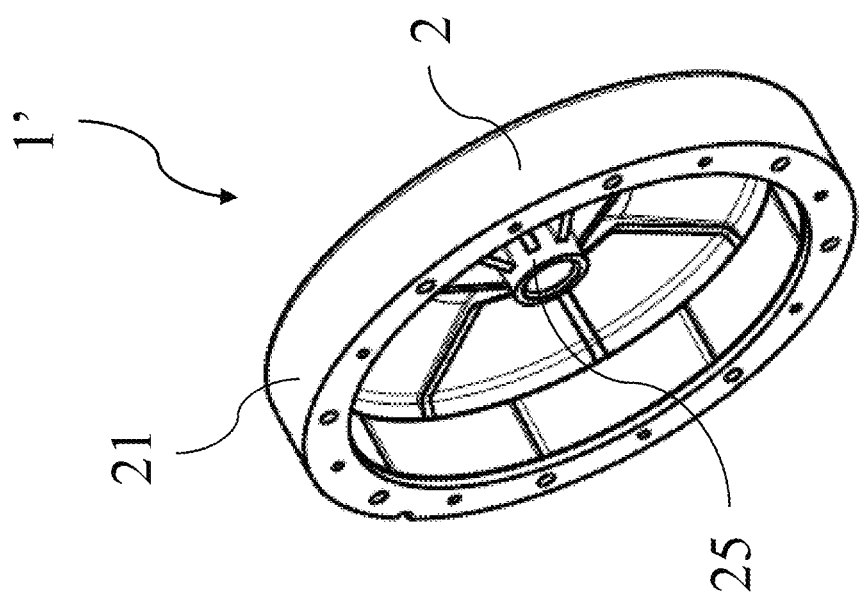
FIG. 7 shows a perspective view of an external rotor in accordance with a second variant of the present invention.
Figure 11:
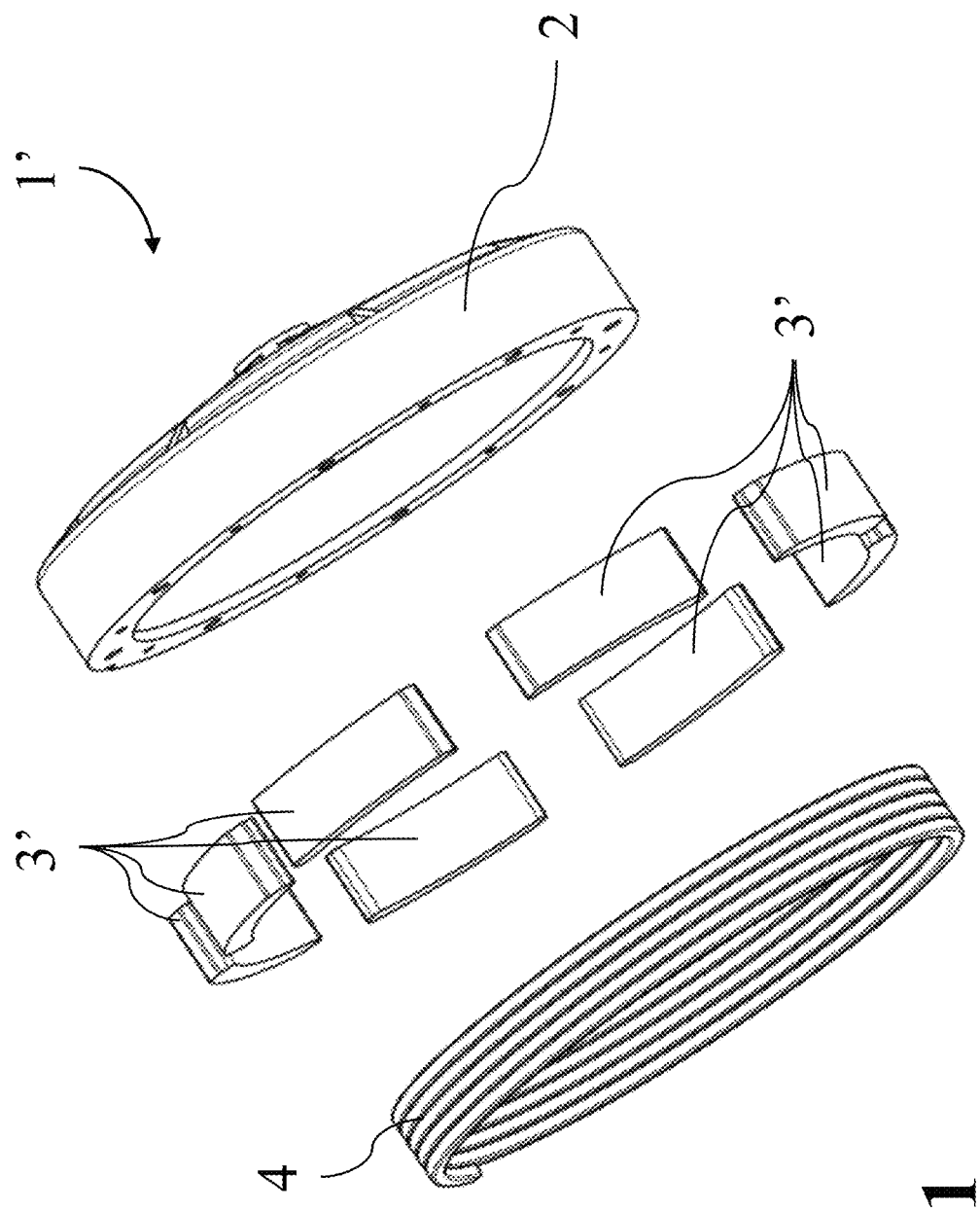
FIG. 11 shows an exploded perspective view of the external rotor in accordance with the second variant of the present invention.

With reference to the attached FIGS. 7-11, 1' identifies a second embodiment of the external rotor. The second embodiment differs from the first embodiment solely owing to the different form of the permanent magnet; the other components of the motor, including the helical spring which defines the metal insert 4, remain substantially unchanged and are identified in the text and in the drawings by the same reference numbers used above.

The external rotor 1' has, instead of a single toroidal magnet 3, a plurality of ferrite magnetic wedges 3' which are arranged next to each other so as to define an annular configuration. The single magnetic wedge 3' has the form of a circle arc and an axial thickness commensurate with that of the side wall 21. The various magnetic wedges 3' arranged alongside each other therefore define a cylindrical body around which the helical spring defining the metal insert 4 is fitted.

In the embodiment the magnetic wedges 3' used to form the external rotor 1' are eight in number; it is obviously possible to modify this number depending on the specific design requirements.

In a manner similar to that of the first embodiment, the assembly consisting of the magnetic wedges 3' and the superimposed metal spring is overmoulded with a plastic cup-shaped body 2 so as to define the final structure of the external rotor 1'.

Obviously a person skilled in the art, in order to satisfy any specific requirements which might arise, may make numerous modifications and variations to the motor and the manufacturing method described above, all of which are contained moreover within the scope of protection of the invention, as defined by the following claims.

The invention claimed is:

1. A permanent magnet external rotor for an electric motor, comprising:
   a cup-shaped body provided with a bottom wall and a circumferential side wall;
   at least one magnet, defining an annular configuration and fixed inside said cup-shaped body; and
   a ferromagnetic metal insert arranged between said circumferential side wall and said at least one magnet so as to define the closure of a magnetic circuit of the electric motor;
   wherein said metal insert is defined by a helical spring, wherein said helical spring has a body helically wound about a rotation axis of the permanent magnet external rotor, said helical spring being elastically fitted around the annular configuration defined by the at least one magnet;
   wherein the helical spring adapts elastically to said annular configuration onto which it is fitted while ensuring at the same time the continuity of material along the entire circumference of said annular configuration and the consequent closure of the magnetic circuit.

2. The external rotor according to claim 1, wherein at least the side wall of said cup-shaped body is made of a plastic material overmoulded on top of the at least one magnet and the metal insert.

3. The external rotor according to claim 2, wherein said cup-shaped body comprises a flange and an internal shoulder which axially confine said metal insert at opposite ends.

4. The external rotor according to claim 3, wherein said flange and said internal shoulder cover, entirely or partly, axial opposed ends of the at least one magnet.

5. The external rotor according to claim 1, wherein the helical spring which defines the metal insert has, in a rest configuration, an internal diameter smaller than the external diameter of the annular configuration defined by the at least one magnet such that said helical spring is elastically deformed when fitted onto said at least one magnet.

6. The external rotor according to claim 1, wherein the helical spring which defines the metal insert has, in a rest configuration, windings packed together and a length substantially equal to an axial length of the at least one magnet.

7. The external rotor according to claim 1, wherein the helical spring which defines the metal insert has windings with a square or rectangular cross-section.

8. The external rotor according to claim 1, wherein said bottom comprises a central hub connected, by means of a solid wall or radial arms, to said side wall.

9. The external rotor according to claim 1, wherein said metal insert is made of ferromagnetic material.

10. The external rotor according to claim 1, wherein said at least one magnet is formed by a single toroidal magnet, defining a plurality of poles.

11. The external rotor according to claim 10, wherein said toroidal magnet is a ring made of plasto-ferrite.

12. The external rotor according to claim 1, wherein said at least one magnet is formed by a plurality of magnetic wedges arranged next to each other so as to define an annular configuration.

13. An electric motor comprising an internal stator provided with a plurality of poles and an external rotor according to one of the preceding claims, mounted rotatably on top of said internal stator, wherein said at least one magnet surrounds the poles with the arrangement of an air gap in between.

14. A method for manufacturing a permanent magnet external rotor for an electric motor, comprising the steps of:

providing a toroidal magnet or a plurality of magnetic wedges arranged next to each other so as to define an annular configuration;

elastically fitting a helical spring made of metallic material around an outer cylindrical wall of said annular configuration defined by the toroidal magnet or by the plurality of magnetic wedges, wherein said helical spring has a body helically wound about a rotation axis of the permanent magnet external rotor;

overmoulding, on top of the toroidal magnet or the magnetic wedges and the helical spring, a cup-shaped body at least partially made of plastic material, wherein said cup-shaped body comprises a bottom and a side wall which surrounds externally the helical spring;

wherein the helical spring adapts elastically to said annular configuration onto which it is fitted while ensuring at the same time the continuity of material along the entire circumference of said annular configuration and the consequent closure of the magnetic circuit.

15. The method according to claim 14, wherein said helical spring is made of ferromagnetic material.

* * * * *